(12) United States Patent
Nielson et al.

(10) Patent No.: US 12,509,291 B2
(45) Date of Patent: Dec. 30, 2025

(54) MICROWAVE PACKAGE WITH LOW PRESSURE VENTING FEATURE

(71) Applicant: Amcor Flexibles North America, Inc., Neenah, WI (US)

(72) Inventors: Ryan S. Nielson, Appleton, WI (US); James R. Lamb, Appleton, WI (US); Jay D. Hodson, Hortonville, WI (US); Peter M. Chen, Appleton, WI (US); Jon P. Lazarus, Greencastle, PA (US)

(73) Assignee: Amcor Flexibles North America, Inc., Neenah, WI (US)

( * ) Notice: Subject to any disclaimer, the term of this patent is extended or adjusted under 35 U.S.C. 154(b) by 107 days.

(21) Appl. No.: 18/383,204

(22) Filed: Oct. 24, 2023

(65) Prior Publication Data

US 2025/0128871 A1    Apr. 24, 2025

(51) Int. Cl.
*B65D 81/34*   (2006.01)
*B29C 65/00*   (2006.01)
*B29C 65/18*   (2006.01)
*B65D 75/00*   (2006.01)
*B65D 75/58*   (2006.01)
*B29L 31/00*   (2006.01)

(52) U.S. Cl.
CPC ......... *B65D 81/3461* (2013.01); *B29C 65/18* (2013.01); *B29C 66/8511* (2013.01); *B65D 75/008* (2013.01); *B65D 75/58* (2013.01); *B29L 2031/7128* (2013.01); *B65D 2575/586* (2013.01); *B65D 2581/3427* (2013.01)

(58) Field of Classification Search
CPC .. B65D 81/3461; B65D 75/008; B65D 75/58; B65D 2575/586; B65D 2581/3427; B29C 65/18; B29C 66/8511; B29L 2031/7128

USPC .................................................. 383/61.3, 100
See application file for complete search history.

(56) References Cited

U.S. PATENT DOCUMENTS 9,527,629 B2   12/2016   Kondo et al.
10,661,948 B2   5/2020   Shimono
(Continued)

FOREIGN PATENT DOCUMENTS

CN    209777149 U   * 12/2019
CN    213084124 U   *  4/2021
(Continued)

OTHER PUBLICATIONS

Machine translation of JP 2013151317 A. (Year: 2013).*
Machine translation of JP 2014141261 A. (Year: 2014).*
Machine translation of JP 2017159911 A. (Year: 2017).*

*Primary Examiner* — Jes F Pascua
(74) *Attorney, Agent, or Firm* — Greg N. Geiser (57) ABSTRACT

A resealable package configured for heating in a microwave oven having at least one vent capable of relieving an internal pressure from an interior space of the package during heating. To protect the integrity of a resealable fastener, such as a zipper reclose feature, the at least one vent is capable of functioning at a low pressure below about 3.0 psi and preferably below about 1.4 psi. The at least one vent includes a specifically shaped outer portion and inner portion integrated into a package seal to allow for a controlled rupture or separation of this seal at the location of the at least one vent. This at least one vent can be formed directly into a seal of the package through a specifically shaped seal bar used during package formation.

17 Claims, 4 Drawing Sheets

(56) References Cited

U.S. PATENT DOCUMENTS

| | | |
|---|---|---|
| 2005/0255200 A1 | 11/2005 | Takahagi et al. |
| 2011/0100983 A1* | 5/2011 | Han .................... B65D 75/008 |
| | | 219/725 |
| 2013/0048636 A1* | 2/2013 | Mack .................. B65D 77/225 |
| | | 220/203.16 |
| 2017/0283155 A1 | 10/2017 | Mishkin |
| 2020/0198841 A1 | 6/2020 | Tanaka et al. |

FOREIGN PATENT DOCUMENTS

| | | | | |
|---|---|---|---|---|
| CN | 113291606 A | * | 8/2021 | |
| CN | 113928654 A | * | 1/2022 | |
| JP | 2005320023 A | | 11/2005 | |
| JP | 2013151317 A | * | 8/2013 | ............. B65D 33/01 |
| JP | 2014141261 A | * | 8/2014 | |
| JP | 2017159911 A | * | 9/2017 | |
| WO | WO-2022163608 A1 | * | 8/2022 | ............. B65B 7/025 |

* cited by examiner

MICROWAVE PACKAGE WITH LOW PRESSURE VENTING FEATURE

TECHNICAL FIELD

This disclosure is related to a package assembly having a resealable closure and a seal with at least one vent that allows for the venting of steam at low pressures during microwave heating. More particularly, this disclosure is related to a package having both a vent and a resealable closure that allows a user of the package to first open the package, season the contents within an interior space of the package, close the package utilizing the resealable closure, and then heat the package in the microwave to cook and warm the contents, wherein the vent will release steam at a pressure that does not compromise the sealing integrity of the resealable closure.

BACKGROUND

Heating food contents within a package is a common endeavor and even more common when utilizing a microwave oven as the cooking appliance. In a typical scenario, a sealed pouch or a sealed package containing the food item is opened slightly prior to heating to allow for the venting of steam during cooking. Due to embedded water molecules within food, contents within a sealed container that are heated to the boiling point of water may rupture or burst. Although opening the package prior to heating is an effective method for the venting of steam during microwave cooking, it is not always desired as some foods are better prepared when heated in an enclosed container that retains at least a portion of the steam generated during heating.

To provide a package that both retains steam and is safe for consumer use, i.e. one that does not burst or rupture during heating, certain packages within the prior art utilize a vent to release steam at a predetermined pressure selected to prevent package rupture. A typical package of this type is pre-sealed and includes the vent within a seal of the package. During heating, the vent allows for a slight separation or rupture of the seal at a designated location and predetermined pressure to prevent the package from rupturing or bursting. Often this package is referred to as a retort pouch. To be a retort pouch as defined within the art, the package must be specifically designed for thermal processing to render any food within the container commercially sterile and shelf stable, wherein the construction materials must be capable of thermal processing at a temperature over 100° C. and withstand an internal pressure of approximately 1 kg/cm$^2$ (~14.2 psi). Although a typical retort pouch provides a robust container for heating, it is not useful in a situation utilizing a resealable closure as the pressure needed for retort applications is too high to maintain the integrity of the resealable closure during heating.

SUMMARY

The developments described herein provide a package assembly for warming in a microwave oven that allows a user of the package the option to open the package, add ingredients, mix the contents, and then reseal the package prior to heating. To provide a package with an interior packaging environment that is capable of the use described above, the package includes a resealable closure and at least one vent capable of relieving pressure within the enclosed interior space. Due to the presence of the resealable closure, the at least one vent is capable of functioning at a low pressure of about 1.4 pounds per square inch (psi) or below to maintain the integrity of the resealable closure. The at least one vent is defined by an outer portion and an inner portion and, in a preferred embodiment, is positioned within a side seal.

The outer portion of the at least one vent is not sealed and generally has a shape that can be described as key-shaped. This key-shape includes a head portion and a stem portion. The head portion has a polygonal shape comprising three to five interior angles with each of the interior angles having a measurement between ninety degrees (90°) and one hundred fifty degrees (150°).

The inner portion of the at least one vent partially surrounds the outer portion, primarily the head portion of the key-shape, with the inner portion generally being a shaped alteration of the seal, preferably a side seal. This shaped alteration has a first recessed portion, a second recessed portion, and an arcuate portion extending towards the interior space in a curvilinear fashion around the head portion and between the first recessed portion and the second recessed portion. Accordingly, the vent portion is a combination of the unsealed outer portion and the shaped alteration of the seal being the inner portion to surround the outer portion. This shaped alteration results in various thicknesses of the seal surrounding the key-shape to generally direct a controlled rupture of the seal at the specific location of the at least one vent. The first recessed portion and the second recessed portion in combination with the arcuate portion and outer portion are specifically shaped and selected to direct a pressure wave within the interior space towards the narrowest portions of the vent portion surrounding the head to asymmetrically rupture or separate the seal at this location allowing for a venting of steam at the vent portion during the process of heating.

The package assembly of the present disclosure can be provided with a single vent portion or multiple vent portions, such as a pair of vents positioned on opposed side seals of an assembled package. The resealable closure may be a type of closure that is commonly referred to as a zipper reclose feature or slider reclose feature, wherein the resealable closure can be opened and then pressed or slid together in an alignment to seal the package.

The vent portion of the package assembly can be provided into or integrated within a variety of package styles, such as, but not limited to, a bag, a pouch, a standup pouch, or other similar common package types that utilize a resealable closure. In one such packaging assembly, the package may be assembled using a front panel, a back panel, and a bottom gusset that are sealed together with a side seal along a pair of side edges.

The package assembly of the present disclosure can be manufactured from a polymeric film. The polymeric film may be comprised of polyolefins and more particularly thermoplastic polyolefins, such as, but not limited to, polypropylene and polyethylene.

BRIEF DESCRIPTION OF THE DRAWINGS

The disclosure may be more completely understood in consideration of the following detailed description of various embodiments of the disclosure in connection with the accompanying drawings, in which.

The drawings show some but not all embodiments. The elements depicted in the drawings are illustrative and not necessarily to scale, and the same (or similar) reference numbers denote the same (or similar) features throughout the drawings.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense. Before the present invention is described in such detail, however, it is to be understood that this invention is not limited to particular variations set forth and may, of course, vary.

Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, gasses, vapors, or communication between two members. Such joining may be achieved with the two members or the two members and any additional intermediate members being integrally formed as a single unitary body with one another or with the two members or the two members and any additional intermediate members being attached to one another.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present disclosure provides improvements to a resealable package configured for microwave use that allows a package user the ability to modify, distribute, and add ingredients to allow for individual taste preferences. For a resealable package to remain sealed within this environment during heating, the integrity of the resealable closure needs to be maintained through the use of a venting feature capable of functioning at a low pressure. Previous package assemblies utilizing a venting feature are not capable of functioning at low pressure and therefore do not include a resealable closure. Rather, these packages are specifically designed with venting to function in the heat and pressures utilized in a retort process.

The solution presented herein provides a specifically shaped vent portion that is integrated within a seal of the package during assembly and configured for use in a non-retort process. Accordingly, the vent portion of the present disclosure allows for the release of steam during heating within a microwave at an internal pressure lower than the pressure needed to open the resealable closure integrated within an opening of the package. This solution is particularly desirable for users who would like to add ingredients to the packaged food contents and mix these ingredients prior to safe heating in the microwave oven. The inclusion of the resealable closure within the package in combination with the at least one vent allows this to be possible.

Figure 1:
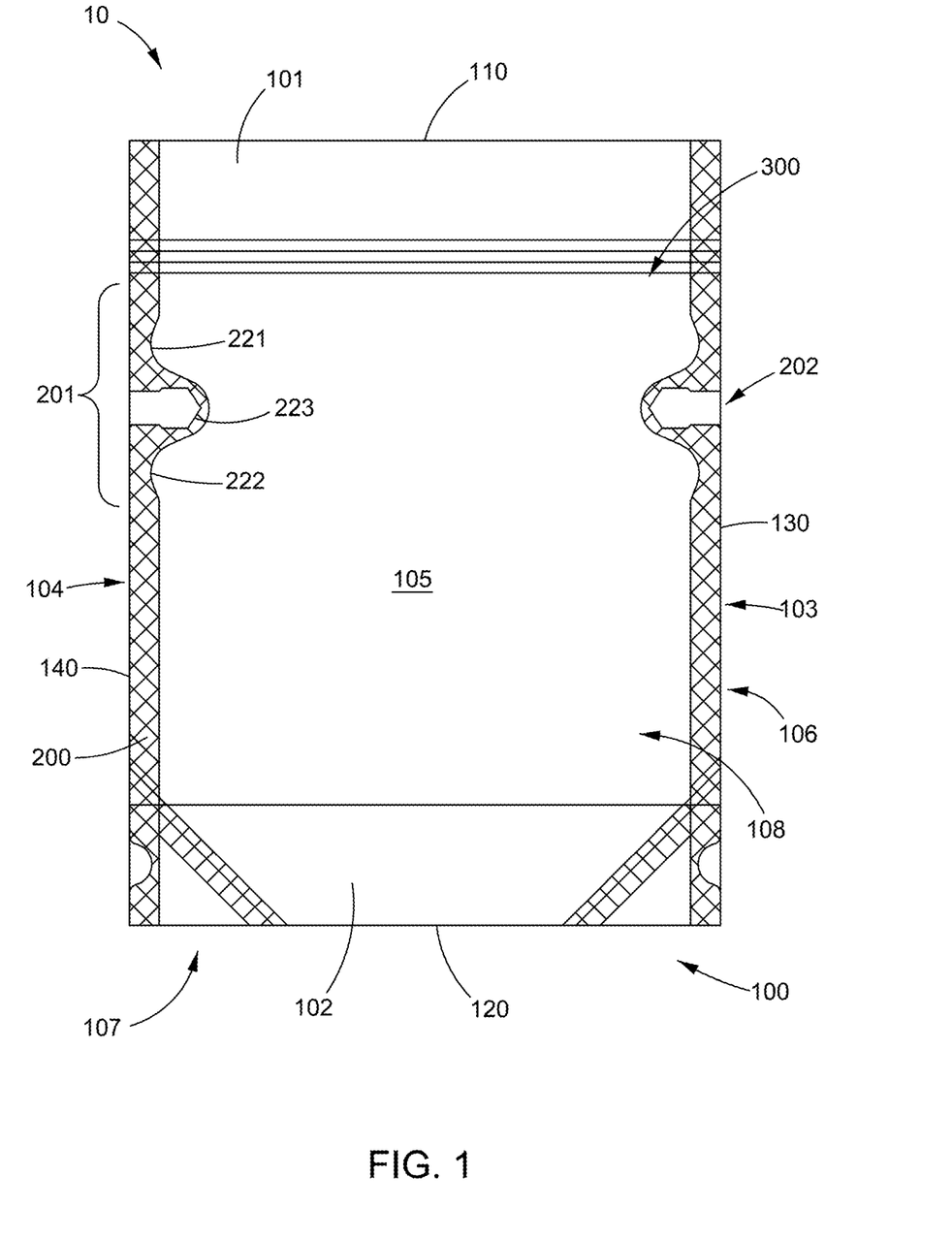
FIG. 1 is a top plan view of a package assembly for a microwave package with a low pressure venting feature.
Figure 2:
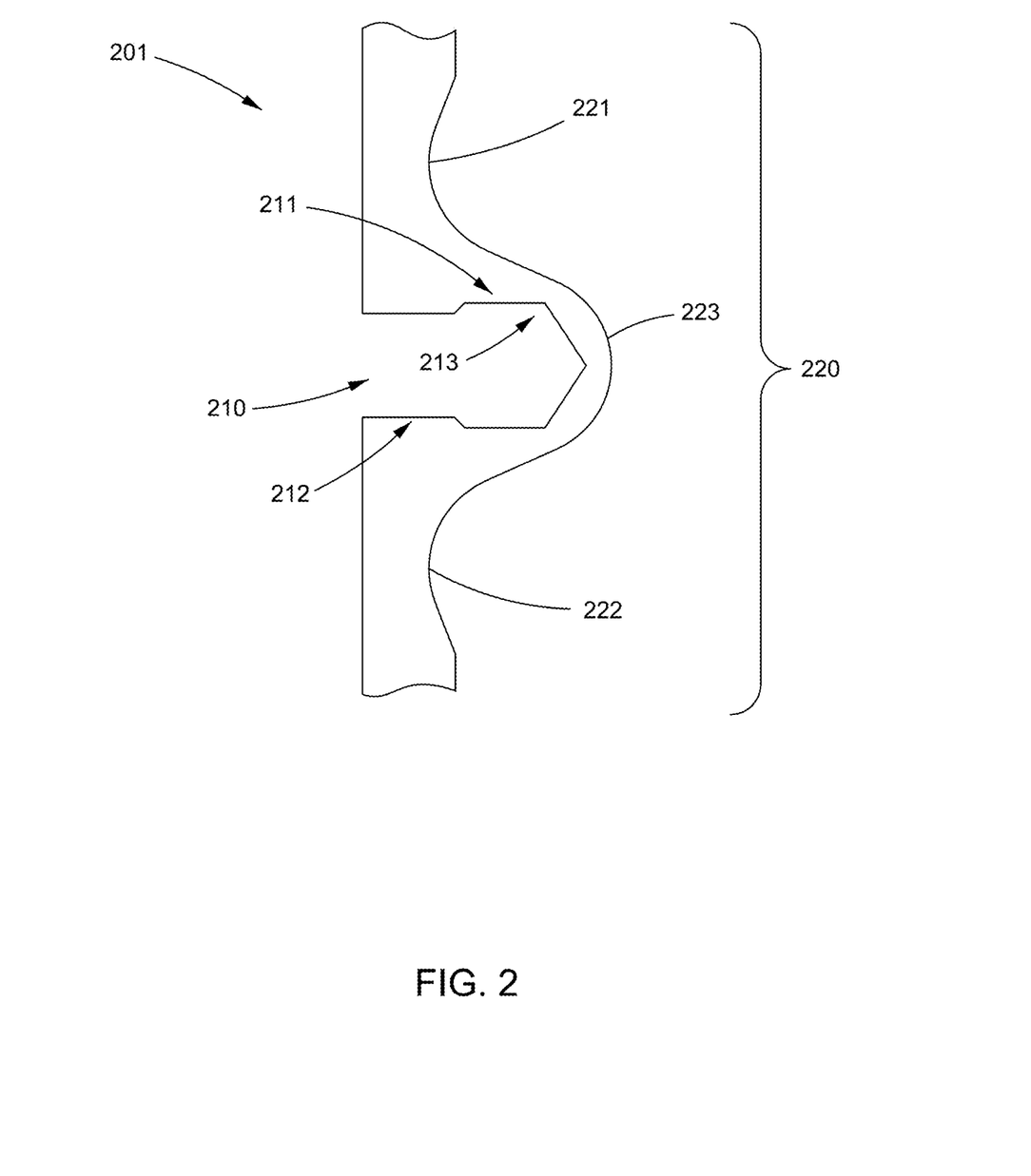
FIG. 2 is an exploded view of the low pressure venting feature of FIG. 1.

Referring now to FIGS. 1-2 of the resealable package for use in a microwave oven formed from a film and generally referred to herein as a package 10. The package 10 may be a stand-up pouch, a bag, or other package style and type formed from the conversion of a film portion 100 on a packaging machine, such as, but limited to a CT-60DLLSC by Totani Corporation of Kyoto, Japan. Depending upon a given package type and style, the package 10, after forming, includes a top portion 101 having a top edge 110, a bottom portion 102 having a bottom edge 120 including a bottom seal, and a pair of side portions 103, 104 with each side portion having a corresponding peripheral edge 130, 140.

When the package 10 is formed into a stand-up pouch it includes a front panel 105, a back panel 106, and a bottom gusset 107.

Regardless of the package 10 style, the side portions 103, 104 peripheral edges 130, 140 are sealed with a seal and referred to herein as a side seal 200. Along with the top portion 101 and bottom portion 102, the side seal 200 forms an enclosed interior space 108 within the package 10. The interior space 108 is generally configured to allow for the placement of various food contents to be sealed within the package 10 during a packaging process.

Formed within the side seal 200 of the package 10 is at least one vent 201. The at least one vent 201 is coupled to the interior space 108 and configured to function as a release mechanism or one-way valve to prevent a build-up of pressure, typically steam pressure, within the interior space 108. The coupling of the interior space 108 with the at least one vent 201 is of the gaseous type, wherein a material in a gas phase, such as water vapor, but not limited to, is capable of movement between the interior space 108 and the at least one vent 201. Although the at least one vent 201 is shown within the side seal 200, the at least one vent 201 can be integrated into several seal locations and does not need to be positionally located on the side of the package 10 as is depicted. Accordingly, the at least one vent 201 can be integrated into any seal in a location that is in communication with the interior space 108, such as, but not limited to, the side, the bottom or the top of a corresponding package.

The at least one vent 201 is an alteration in the shape of the side seal 200 and is defined by an outer portion 210 and an inner portion 220. The outer portion 210 is not sealed and can generally be described as being key-shaped and defined by a head portion 211 and a stem portion 212. The head portion 211 has a specific shape that can be described as a polygonal shape comprising three to five interior angles 213. The three to five interior angles 213 have a measurement between 90° and 150° to generally shape the polygonal shape of the head portion 211. Although the head portion 211 shape is described as being polygonal, it is not technically a polygon since the shape of the head portion 211 is not enclosed on all sides. Rather, the polygonal shape of the head portion 211 is coupled with the stem portion 212 to form the key-shape, wherein the head portion 211 is an interior most extension of the stem portion 212 to create the cohesive key-shape. An exterior most portion of the stem portion 212 is adjacent to the peripheral edge and not sealed to allow for the function of venting and the release of pressure from the interior space 108. The preferred polygonal shape of the head portion 211 can alternately be described as being hexagonal as the head portion mostly resembles a portion of a regular hexagon with the interior angles 213 having a measurement of about 120°.

The inner portion 220 can most generally be described as a shaped alternation of the side seal 200 surrounding at least a section of the outer portion 210 to form the pressure release mechanism. The inner portion 220 includes a first recessed portion 221, a second recessed portion 222, and an arcuate portion 223. The arcuate portion 223 extends away from the peripheral edge 130, 140 and towards the interior space 108 in a curvilinear fashion between the first recessed portion 221 and the second recessed portion 222. The shaped alteration of the side seal 200 in the form of the arcuate portion 223 primarily surrounds the head portion 211 of the outer portion 210. Accordingly, the pressure relief mechanism is provided by the inner portion 220 initially being sealed but designed to separate and form an opening to release pressure at a low pressure as it builds within the interior space 108.

Accordingly, the at least one vent 201 is a combination of the unsealed outer portion 210 key-shape and the shaped alteration of the inner portion 220 to surround the outer portion 210. The shaped alteration of the inner portion 210 provides a variation in a thickness of the seal surrounding the key-shape of the outer portion 210 to generally direct a controlled rupture of the seal at the location of the at least one vent 201 and at a pressure of the interior space 108 that is considered low. The first recessed portion 221, the second recessed portion 222, the arcuate portion 223, and the outer portion 210 specific position and shape relative to each other are selected to direct this pressure wave within the interior space 108 towards a narrowest thickness of the inner portion 220.

The thickness of the inner portion 220 at a position in approximate alignment with a position surrounding the head portion 211, allows for an asymmetrical rupture or separation of the seal at this location to allow for a venting of steam at a low pressure. Low pressure is generally utilized herein to refer to a pressure that is below the typical pressures seen in a traditional retort process. Additionally to further comport with the disclosed structures herein, low pressure is additionally defined to be a pressure that is below the typical pressure necessary to rupture a resealable closure 300, wherein this low pressure is of about below 3.0 pounds per square inch gauge (psig). The pressure may be between a range of about 0 to 1.4 pounds per square inch gauge (psig). The pressure within the internal space 108 is preferably controlled at the range of 0 to 1.4 psig to safely maintain the integrity of the resealable closure 300, wherein this resealable closure will likely rupture and not be capable of maintaining a seal at an internal pressure of the interior space 108 beyond 1.4 psig.

Accordingly, the at least one vent 201 is configured and optimized through the various shapes and features of the outer portion 210, inner portion 220, head portion 211, interior angles 213, stem portion 212, first recessed portion 221, second recessed portion 222, and arcuate portion 223 to function and provide pressure relief at pressure below of about 1.4 psig. Preferably, the at least one vent 201 is capable of functioning at a pressure lower than about 1.0 psig or lower than of about 0.8 psig to ensure that the resealable closure 300 remains sealed as pressure builds during the process of heating.

The package 10 includes the resealable closure 300 configured to allow for sealing, unsealing, and access to the interior space 108. The resealable closure 300 extends between the side portion 103, 104 respective peripheral edges 130, 140 and provides an opening and closing feature that allows for manipulation by a user to open and close the package 10 with the closed position providing a sealed interior space 108. As shown in FIG. 1, the resealable closure 300 is positioned along a height of the package 10 between the top edge 110 and the at least one vent 201, wherein the resealable closure 300 provides access to the interior space 108 and the contents within. Accordingly, the at least one vent 201 is positioned within the area of the interior space 108 defined by the resealable closure 300 and the sealed package peripheral edges 130, 140 and bottom edge 120 to function as a release mechanism for the build-up of pressure within this bounded interior space 108. The resealable closure 300 is preferably of the zipper reclose style which may be commonly or alternately be referred to as a webless string zipper type, a flanged press to close zipper type, or a slider zipper type. Most generally, the resealable closure 300 is selected from, and of the type and material composition, that can be integrated within the package 10 or generally adhered, fused, secured, or positioned into, upon, or within the film portion 100 during package 10 forming, assembly, construction, and/or filling.

The resealable closure 300 may utilize an alternate resealable opening and closing fastener that is not of the zipper reclose type, such as, but not limited to, hook and loop style fasteners, adhesive-based fasteners, snap or press-based fasteners, and other known mechanical fasteners that are common to placement within a package or use with a film for constructing a package.

The package 10 of the present disclosure can be provided with a single at least one vent 201 or multiple vents portions, such as a pair of vents with the at least one vent 201 and a second vent 202 positioned on opposed sides of the package 10. Each of the at least one vent 201 and the second vent being identical in shape, wherein the at least one vent 201 and the second vent 202 are considered duplicative and redundant. Accordingly, a given package can include a multitude or plurality of vents through the duplication of the at least one vent 201 in multiple positions in a package as successive vents, wherein the package may include the at least one vent 201, the second vent 202, a third vent, and a fourth vent, etc.

Further, the at least one vent 201 of the package 10 can be provided into or integrated within a variety of package styles and types, such as, but not limited to, a bag, a pouch, a standup pouch, or other similar common package types that utilize a resealable closure.

The package 10 of the present disclosure utilizes the film portion 100 to provide an assembly and arrangement of a polymeric film to enclose a product by providing the sealed interior space 108. The polymeric film portion 100 may be comprised of polyolefins and more particularly thermoplastic polyolefins, such as, but not limited to, polypropylene and polyethylene.

Figure 3:
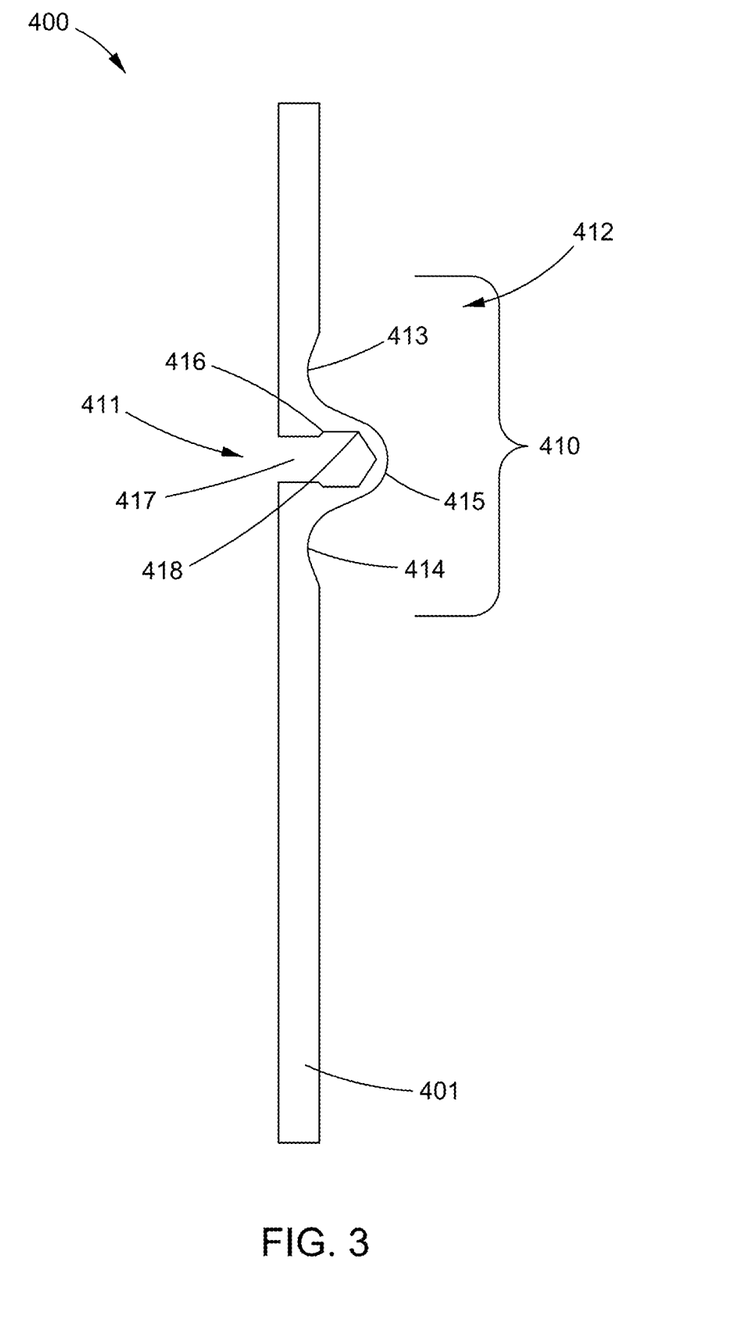
FIG. 3 is a top plan view of a heat seal bar for forming the low pressure venting feature during manufacture of the package assembly.

Referring now to FIG. 3, to provide a package 10 having the features to allow for venting at low pressure to maintain the integrity of the resealable closure 300, a method of manufacture for package assembly utilizes a sealing tool in the form of a seal bar 400. The seal bar 400 is generally fabricated from a metal and configured for placement within a sealing mechanism of a packaging machine to generally create and form a seal, such as the side seal 200 of package 10 shown in FIG. 1, during package assembly. The seal bar 400 is typically utilized in combination with heat and pressure to generally adhere the film portion 100 to itself or an adjacent film portion 100 or other compatible material to form the package 10. Accordingly, the seal bar 400 is fabricated to have a shape corresponding to the shape of the seal desired to be imparted to the package 10.

To provide a seal with a venting feature as discussed above, the seal bar 400 includes a first width 401 generally conforming to the width of the desired seal for the package. The seal bar 400 first width 401 is consistent throughout an entire length of the seal bar 400 with the exception of a vent portion 410 corresponding to a desired position of the at least one vent to be integrated within the seal of a sealed package. This vent portion 410 is specifically shaped and dimensioned to form the at least one vent during formation of the sealed package by having an outer seal portion 411 and an inner seal portion 412. Accordingly, the inner seal portion 412 forms the inner portion and defines the shape of the outer portion of the at least one vent at the vent portion 410 by providing a first recessed portion width 413, a second recessed portion width 414, and an arcuate seal portion 415 extending between the first recessed portion width 413 and the second recessed portion width 414 in a curvilinear fashion towards an intended interior space of the package the seal bar 400 is participating in the formation of. Therefore, the positive shape of the inner seal portion 412 defines the corresponding features of the outer seal portion 411 in the form of a cut-out portion within the vent portion 410 of the seal bar 400, wherein this cut-out portion will not be sealed during package formation.

The outer seal portion 411 includes a cut-out that includes a head 416 and a stem 417 forming a contiguous key-shape. The head 416 has a specific shape that can be described as a polygonal shape comprising three to five interior angles 418. The three to five interior angles 418 have a measurement between 90° and 150° to generally form this polygon shape of the head 416. The head 416, although generally resembling a polygon, is not technically a polygon since the shape of the head 416 is not enclosed on all sides. Rather, the polygonal shape of the head 416 is coupled contiguous with the stem 417 to form the key-shape, wherein the head 416 is intended to be an interior most extension of the stem 417 to create the cohesive key-shape. The stem 417 is intended for positioning adjacent to a peripheral edge of the formed package and is not sealed to allow for the function of venting. The preferred polygonal shape of the head 416 can alternately be described as being hexagonal as the head 416 mostly resembles a portion of a regular hexagon with the interior angles 418 having a measurement of about 120°.

As can be understood from the mechanism of operation of a packaging machine, the shape of the seal bar 400 is critical to forming the at least one vent 201 (FIG. 1) by positively imparting a seal shape corresponding to the inner portion 220 during package forming to allow for venting during use of the package.

As used herein, the term "seal" refers to any bond of a film portion surface to itself, a second film portion, or other compatible material utilized in package formation. This seal may include heat or any type of adhesive material, thermal or otherwise. In some embodiments, a seal may be formed by heating the film portions to at least their respective seal initiation temperatures. The sealing can be performed by any one or more of a wide variety of means, such as, but not limited to, using a heat sealing, impulse sealing, radio frequency sealing, ultrasonic sealing, hot air, and the like, provided that any seal requiring venting utilizes a sealing tool that is configured to produce the final shape of the vent portion as described herein.

The package may be of any style or format. For example, the package may be in the form of a stand-up pouch as shown in FIG. 1, having a single packaging component (i.e., the film portion) heat sealed to itself and forming the entire package. Another example of a package is a sachet, having a front and back panel sealed to each other at the edges. A sachet may have the same packaging material on the front and back panel, each being a first packaging component, or a sachet may have a different packaging material on the front and back panel, a first and a second packaging component, respectively.

As used throughout this application, the term "polypropylene" or "PP" refers to, unless indicated otherwise, propylene homopolymers or copolymers. Such copolymers of propylene include copolymers of propylene with at least one alpha-olefin and copolymers of propylene with other units or groups. The term "polypropylene" or "PP" is used without regard to the presence or absence of substituent branch groups or other modifiers. Polypropylene includes, for example, homopolymer polypropylene, polypropylene impact copolymer, polypropylene random copolymer, etc. Various polypropylene polymers may be recycled as reclaimed polypropylene or reclaimed polyolefin.

The term "film" or "film portion", as used herein, refers to a web built of layers and/or films, all of which are directly adjacent to and connected to each other. A film can be described as having a thickness that is insignificant as compared to the length and width of the film. Films are generally regarded as having two major surfaces, opposite each other, expanding in the length and width directions. As used herein, a "laminate" is a film that may be built from an unlimited number of films and/or layers, the films and/or layers being bonded together by any known process such as, but not limited to, coextrusion, coating or laminating, to form a composite article.

The term "layer," as used herein, refers to a building block of a film or laminate that is a structure of a single material type, a homogeneous blend of materials or a dispersion blend of materials. A layer may be a single polymer, a blend of materials within a single polymer type, or a blend of various polymers, may contain metallic materials and may have additives. Layers may be continuous with the film (i.e., coextensive with the film) or may be discontinuous or patterned. A layer has an insignificant thickness (z direction) as compared to the length and width (x-y direction), and therefore is defined to have two major surfaces, the area of which are defined by the length and width of the layer. An exterior layer is one that is connected to another layer at only one of the major layer surfaces. In other words, one major surface of an exterior layer is exposed. An interior layer is one that is connected to another layer at both major surfaces. In other words, an interior layer is between two other layers. A layer may have sub-layers.

The term "package" is used herein to describe an article that may house an object (i.e., a product), the article formed by bonding one or more films or other packaging components to itself or each other around a periphery, thus forming a package interior space. A "packaged product" refers to the one or more packaging components forming a hermetically sealed package and the product therein. As used herein, hermeticity refers to a seal or sealed package that is completely closed and essentially airtight. Hermetically sealed packages generally have a need for storage and package integrity over a period that is greater than a few days. Package integrity includes a consistent appearance, maintenance of barrier properties, maintenance of lamination bonds, and maintenance of seals.

The product utilized in the package of the present disclosure may be any type of food, consumer good or industrial good that can be heated within a microwave oven. Examples of products include, but are not limited to, food items containing roughly eighty percent (80%) water, such as, but not limited to, brussels sprouts, and broccoli.

The packaged products disclosed herein include a package formed from at least one film portion and optionally other components. In some embodiments of the packaged product, the entire package is formed from a single film portion that has been folded over and sealed to itself (i.e., a flow wrap or stick pack configuration). In some embodiments of the packaged product, a film is sealed to another film (i.e., a sachet configuration). In some embodiments of the packaged product, a film may be a lidding component.

The packaged products disclosed herein advantageously include a package and/or a film which may allow the product to have a shelf-life of up to one week, up to two weeks, up to one month, up to two months, up to three months, up to four months, up to months, up to six months, up to seven months, up to eight months, up to nine months, up to 10 months, up to 11 months or up to 12 months. The shelf-life is dependent upon one or more variables including: the product packaged, the storage conditions of the packaged product and the barrier of the packaging components. As used herein, the shelf-life of a packaged product is the time period in which the product maintains quality (i.e., taste and appearance) acceptable for consumer use. The shelf-life may be determined due to degradation of product color, taste or suitability for consumption (i.e., microbial growth).

In some embodiments, the packaged product is refrigerated during storage and distribution (i.e., during the packaged product shelf-life). In other embodiments, the packaged product may be stored at non-refrigerated or room temperature conditions. It has been found that refrigerated storage of the packaged product may assist in prolonging the time frame in which the film can maintain high barrier, thus lengthening the shelf-life of the packaged product.

EXAMPLES AND DATA

Figure 4:
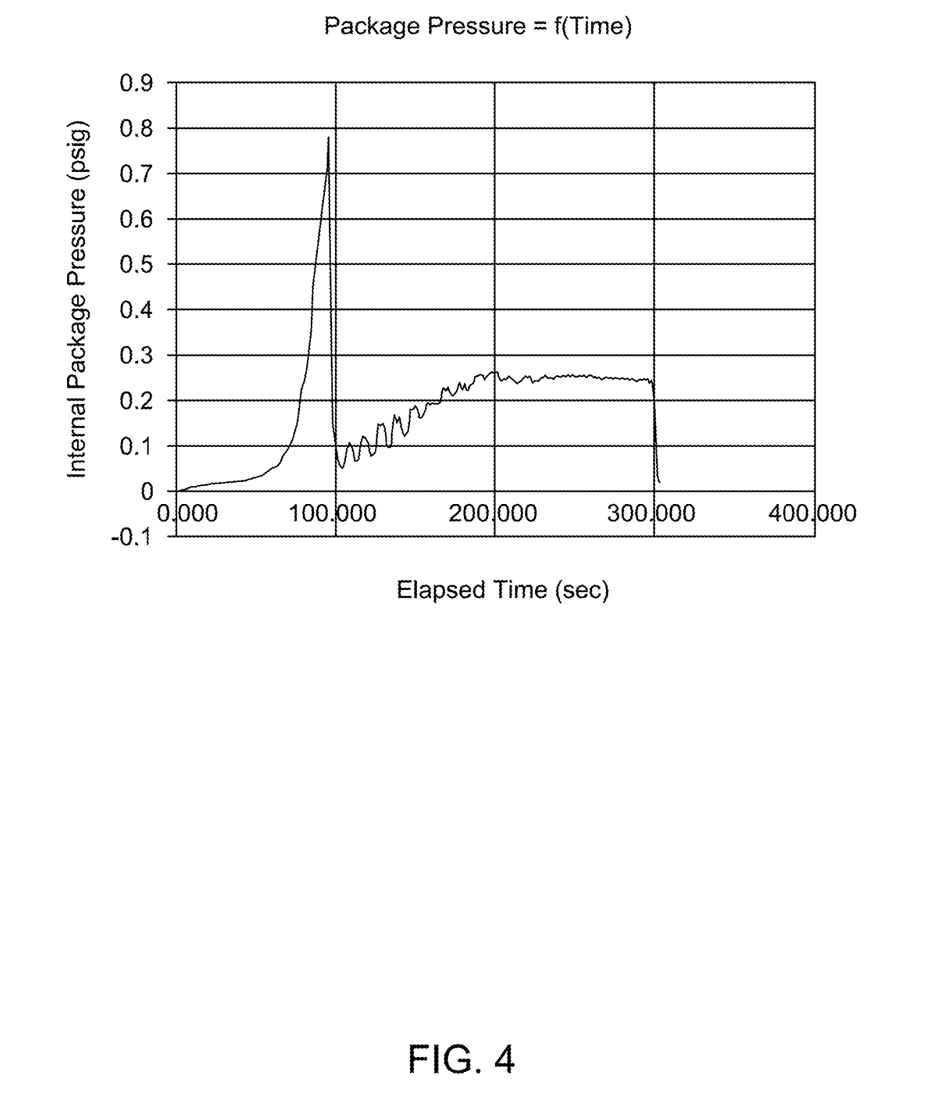
FIG. 4 is a pressure graph showing the function of the venting feature integrated into an exemplary package.

A package in the form of a zippered stand up pouch was created and formed having a pair of vents utilizing the seal bar 400 to form a side seal. The package was formed from a film portion of polypropylene having a polypropylene-based sealant on an interior surface of the film portion. The package zippered closure was opened to ensure access to the interior space and then closed to seal the interior space. The internal pressure of this package was measured and recorded. When the internal pressure of this package reached of about 0.8 psig, the at least one vent functioned and pressure was released. An exemplary pressure graph from one of these experiments is shown FIG. 4. At this pressure, the zippered closure remained sealed and steam was vented from the package. In additional experiments, the zippered closure of an exemplary package was contaminated with typical ingredients that may be added to food product for heating, such as, butter, oils, fats, and seasoning and closed. The package was then subjected to heating in a microwave oven. In each of these experiments, the package vent functioned as intended and the zippered closure remained sealed.

What is claimed is:

1. A resealable package formed from a film portion for use in a microwave oven, the resealable package comprising:
   a top portion having a top edge;
   a bottom portion having a bottom edge;
   a pair of side portions, each side portion of the pair of side portions having a peripheral edge, the peripheral edge being sealed along the entire side portion between the top edge and the bottom edge by a side seal to enclose an interior space;
   a resealable closure, the resealable closure extending between the peripheral edges of the side portions and positioned between the top edge and a vent;
   the vent being positioned within the side seal and comprising:
      an outer portion that is unsealed and key-shaped, the outer portion including a head portion and a stem portion, the head portion having a polygonal shape comprising three to five interior angles, each angle measuring between 90 and 150 degrees;
      an inner portion surrounding the outer portion, the inner portion being a shaped alteration of the side seal and comprising:
         a first recessed portion extending inward from the side seal;

a second recessed portion spaced from the first recessed portion and extending inward from the side seal; and an arcuate portion connecting the first and second recessed portions in a curvilinear path around the head portion and extending toward the interior space; and wherein the configuration of the inner portion is adapted to facilitate controlled deformation and planned venting during heating.

2. The resealable package as in claim 1, comprising a second vent, the second vent mirroring the vent and positioned within the side seal opposite the vent, the second vent comprising:

an outer portion that is unsealed and key-shaped, the outer portion including a head portion and a stem portion, the head portion having a polygonal shape comprising three to five interior angles, each angle measuring between 90 and 150 degrees;

an inner portion surrounding the outer portion, the inner portion being a shaped alteration of the side seal and comprising;

a first recessed portion extending inward from the side seal;

a second recessed portion spaced from the first recessed portion extending inward from the side seal; and an arcuate portion connecting the first and second recessed portions in a curvilinear path around the head portion and extending toward the interior space.

3. The resealable package as in claim 2, wherein the vents function to relieve a build-up of pressure within the interior space during heating of the resealable package at a pressure at least equal to or below 1.4 pounds per square inch (psi).

4. The resealable package as in claim 2, wherein the vents function to relieve a build-up of pressure within the interior space during heating of the resealable package at a pressure at least equal to or below 1.0 pounds per square inch (psi).

5. The resealable package as in claim 1, wherein the film portion is comprised of a polypropylene.

6. The resealable package as in claim 1, wherein the resealable closure is a zipper reclose feature.

7. The resealable package as in claim 1, wherein the resealable package is a stand-up pouch.

8. The resealable package as in claim 1, wherein the vent functions to relieve a build-up of pressure within the interior space during heating of the resealable package at a pressure at least equal to or below 1.4 pounds per square inch (psi).

9. The resealable package as in claim 1, wherein the vent functions to relieve a build-up of pressure within the interior space during heating of the resealable package at a pressure at least equal to or below 1.0 pounds per square inch (psi).

10. A stand-up pouch configured for use in a microwave oven, the stand-up pouch comprising:

a front panel;
a back panel;
a bottom gusset;
a top edge having a top seal;
a pair of side edges, each edge of the pair of side edges being sealed along the entire side edge between the top edge and the bottom gusset by a side seal to enclose an interior space, the interior space bound at least by the front panel, the back panel, the bottom gusset, the top edge, and the pair of side edges;

a vent being positioned within the side seal and comprising:

an outer portion that is unsealed and key-shaped, the outer portion including a head portion and a stem portion, the head portion having a polygonal shape comprising three to five interior angles, each angle measuring between 90 and 150 degrees;

an inner portion surrounding the outer portion, the inner portion being a shaped alteration of the side seal and comprising:

a first recessed portion extending inward from the side seal;

a second recessed portion spaced from the first recessed portion and extending inward from the side seal; and an arcuate portion connecting the first and second recessed portions in a curvilinear path around the head portion and extending toward the interior space;

a resealable closure, the resealable closure extending between the side edges and positioned between the top edge and the vent, the resealable closure providing access to the interior space, wherein the resealable closure can be opened and closed to prevent and allow access to the interior space; and wherein the configuration of the inner portion is adapted to facilitate controlled deformation and planned venting during heating.

11. The stand-up pouch as in claim 10, comprising a second vent, the second vent positioned within the side seal opposite the vent, the second vent mirroring the vent.

12. The stand-up pouch as in claim 11, wherein the vent and the second vent function to relieve a build-up of pressure within the interior space during heating of the resealable package at a pressure at least equal to or below 1.4 pounds per square inch (psi).

13. The stand-up pouch as in claim 11, wherein the vent and the second vent function to relieve a build-up of pressure within the interior space during heating of the resealable package at a pressure at least equal to or below 1.0 pounds per square inch (psi).

14. The stand-up pouch as in claim 10, wherein the stand-up pouch comprises a film portion comprised of a polypropylene.

15. The stand-up pouch as in claim 10, wherein the resealable closure is a zipper reclose feature.

16. The stand-up pouch as in claim 10, wherein the vent functions to relieve a build-up of pressure within the interior space during heating of the resealable package at a pressure at least equal to or below 1.4 pounds per square inch (psi).

17. The stand-up pouch as in claim 10, wherein the vent functions to relieve a build-up of pressure within the interior space during heating of the resealable package at a pressure at least equal to or below 1.0 pounds per square inch (psi).

* * * * *